Figure 1:
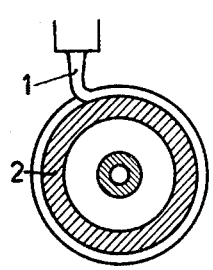

Oct. 26, 1965 A. H. EDENS 3,214,255
METHOD AND DEVICE FOR THE MASS PRODUCTION
OF GLASS ROD AND GLASS TUBE
Filed April 29, 1960 2 Sheets-Sheet 1

INVENTOR
ARIE H. EDENS.
BY
AGENT 3,214,255
METHOD AND DEVICE FOR THE MASS PRODUCTION OF GLASS ROD AND GLASS TUBE
Arie Harm Edens, Eindhoven, Netherlands, assignor to North American Philips Company, Inc., New York, N.Y., a corporation of Delaware
Filed Apr. 29, 1960, Ser. No. 25,599
Claims priority, application Netherlands, May 2, 1959, 238,826
3 Claims. (Cl. 65—71)

A method of manufacturing glass tube or glass rod is known in which a glass stream is supplied from a feeder to one end of a declined mandril rotating about its longitudinal axis, the glass envelope, developed on the periphery of this mandril from the glass stream supplied and surrounding this mandril being pulled off at the other end of the mandril, the glass mass present on the mandril being subjected to supply of heat. By this method it is ensured that the surface of the glass envelope which is ribbed due to the glass stream flowing in the form of a band onto the mandril is levelled and, as reckoned in the downward direction of the mandril, undergoes an increase in temperature such that at the lower end of the mandril the desired temperature for the running off of the glass is obtained. Now, it appears that drawn glass tube or glass rod shows so-called drawing stripes which are not particularly desirable for the quality of the product obtained.

An object of the present invention is to mitigate this disadvantage.

The invention is based upon recognition of the fact that such drawing stripes probably occur in the following way. During the helical flowing of the glass stream onto the mandril, the glass stream assumes the shape of a band or ribbon and the cross-sections of the turns of this helical band slide one over another during some revolutions of the mandril. As a result thereof, a portion of the free band surface of one turn comes on the free surface of another turn, whereby the surface of the glass is exposed in part to the atmosphere surrounding the mandril. Now, volatile components which are useful for the chemical composition of the glass are liable to evaporate from the glass surface. Consequently, after the said relative shifting of the cross-sections of two adjacent turns has ceased, boundary layers of different chemical composition occur in the material of the glass envelope, which boundary layers do not disappear during the further sliding of the glass envelope over the mandril, whereby the ribs of the surface of the glass envelope are levelled, but are drawn out into so-called drawing stripes which are visible in the finished product.

This disadvantage is substantially obviated by the method according to the present invention in that, as viewed in the downward direction of the mandril, the glass envelope present on the mandril is heated in a heating zone so that the temperature of the outer surface of the glass envelope increases, according as the glass is farther remote from the starting point of the heating process, said surface subsequently being subjected to cooling such that, at the end of the cooling process, the desired temperature for running off of the glass is obtained.

It is thus possible to work with a considerably lower temperature of the glass stream flowing onto the mandril, which temperature is chosen to be so low that the flowing of the glass onto the mandril is just not impeded. This lower temperature of the glass stream results in considerable suppression of the said evaporation. In the case of lead glass, for example, it is thus possible to work with a temperature of the glass stream which is more than 100° C. lower than in the conventional method.

Supplying heat to the surface of the glass envelope is known per se. However, the temperature of the glass stream is then always higher than the temperature of the glass envelope forming on the mandril. The heating of the glass envelope in this case serves only to compensate for undue cooling of the surface of the envelope. In the method according to the invention, the temperature of the glass envelope in the heating zone increases, as viewed in the downward direction of the mandril, to a value which is even higher than the temperature of the glass stream. In this zone the outer surface of the glass envelope, which is still ribbed, is levelled.

In one advantageous embodiment of the method according to the invention, the starting point of the heating process is chosen so as to coincide with the end of the period of the rolling off of the turns of the glass envelope, it thus being avoided that boundary layers of a chemical composition differing from that of the remaining portion of the glass may form in the glass material at a later stage.

It will be evident that in the method according to the invention the temperature of the glass envelope in the heating zone is raised to an extent such that, after heating, it requires to be reduced to the temperature desired for running off of the glass at the lower end of the mandril. If this would require the use of a larger specific surface of the mandril, which implies a considerable risk of deglazing for various glasses, in another embodiment of the invention, this may be solved by causing the glass envelope to pass, after the heating zone, a zone for cooling, in which, as viewed in the downward direction of the mandril, the raised temperature of the outer surface of the glass envelope is reduced by forced cooling to the desired temperature for the running off of the glass at the end of the mandril. It is thus achieved that the specific outer surface of the mandril remains limited in size. In addition, the temperature variation during cooling may be fully governed by suitable division of the cooling body into sections.

One advantageous embodiment of a device according to the invention is obtained if, in the presence of an outlet aperture for liquid glass and a declined rotary mandril, a heating device is arranged about this mandril which can slide in the direction of the length thereof. Indirect heating of the glass enevlope on the mandril by means of a radiating body is then preferred to direct heating by means of a burner, since with heat transfer due to radiation the thermal energy is not only communicated directly to the outer surface, but also directly penetrates to glass layers situated beneath the surface. Consequently, the temperature gradient in a cross-section of the glass envelope is smaller than would be the case with convective heating by means of hot gasses.

In another advantageous embodiment of a device according to the invention, a cooling device is arranged, as viewed in the downward direction of the mandril, in line with the heating device. For similar reasons as mentioned with the heating device, cooling by means of a cooling body surrounding the glass envelope is preferred to cooling by means of a flow of air.

Figure 2:
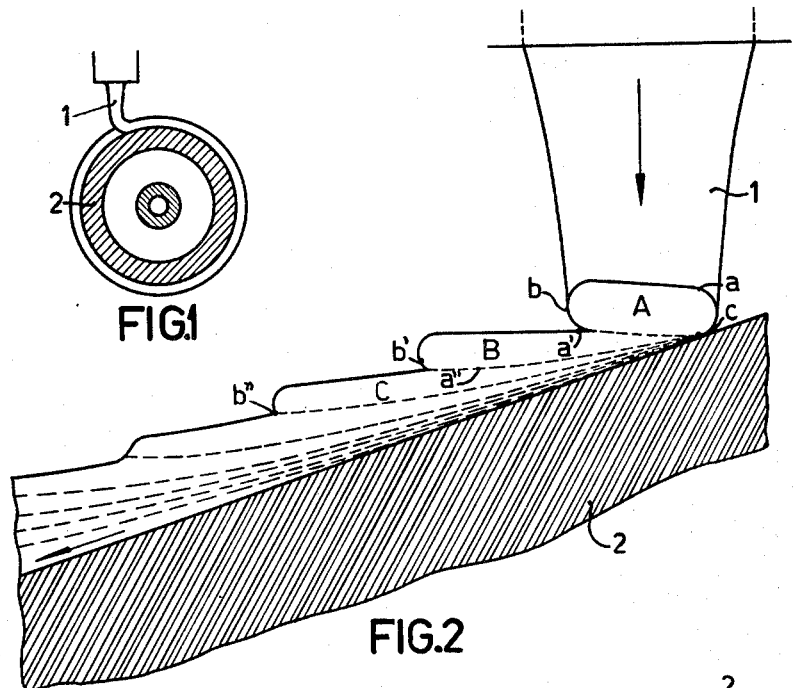
Figure 3:
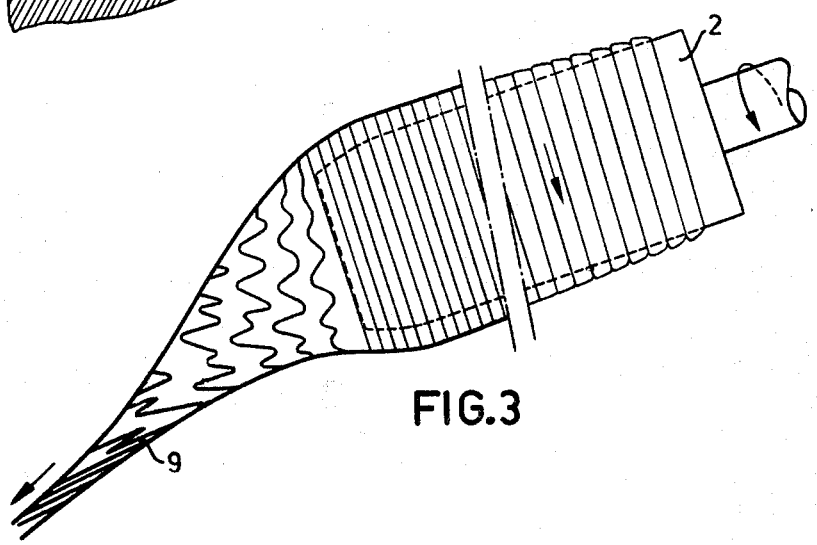
Figure 4:
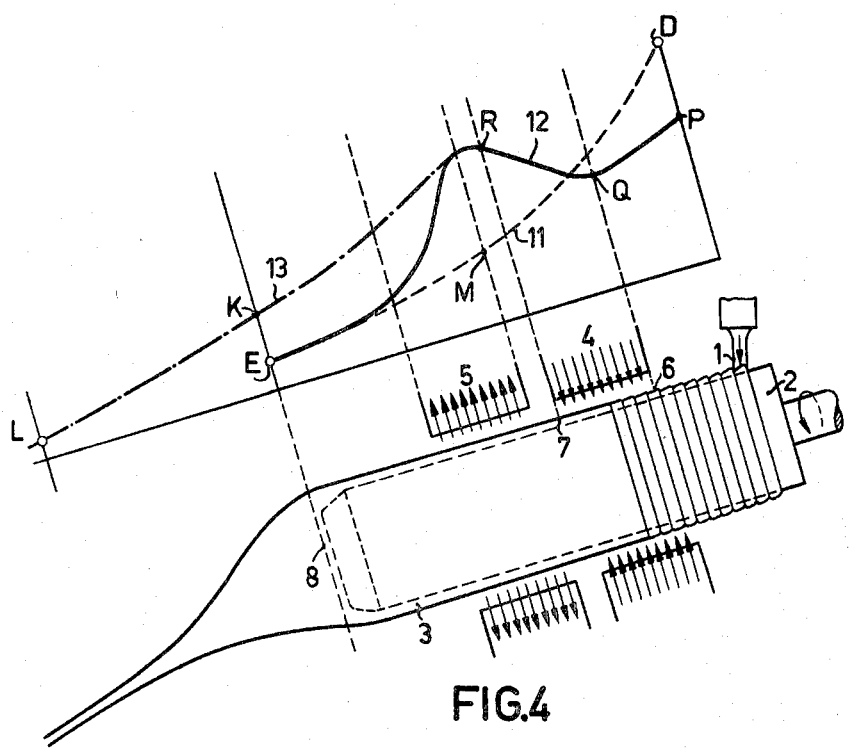

In order that the invention may be readily carried into effect, one embodiment thereof will now be described in detail, by way of example, with reference to the accompanying diagrammatic drawings, in which:

FIGURES 1 and 2 show the flowing of the glass stream onto the mandril and the movement of the glass during several revolutions of the mandril such as this takes place in the known method and in a method according to the invention. FIGURE 3 shows in what manner drawing stripes are produced at the lower end of the mandril in the known method. FIGURE 4 shows a mandril with its heating zone and cooling zone according to the invention, together with several curves of temperatures measured on the outer surface of the glass envelope present on the mandril for both the known method and that according to the invention.

A glass stream 1 (see FIGURES 1 and 2) flows out of a feeder (not shown) onto a declined mandril 2 and winds itself in the form of a band (A) round this mandril. Due to the action of gravity, this band assumes the shape of a ribbon growing thinner and wider (B and C). This widening takes place in the direction of drawing. As a result thereof, the side of one turn rolls off over the ridge of a previous turn, the points $a$, $b$ and $c$ indicated in FIGURE 2 displacing themselves approximately via $a'$, $b'$ and $c$ to $a''$, $b''$ and $c$. During this rolling off, a portion of the surface of one turn is buried by the surface of the subsequent turn, the rolling off process going on until the ribbon has become so thin that the rolling-off forces become smaller than the wetting forces between adjacent turns. After rolling off ($b''$), the sharp transition between adjacent turns disappears and the levelling process continues. During this process, the wave heads sink away and the waves dales rise. This goes on until the glass envelope has acquired a smooth outer surface.

During the rolling-off process, a portion of the band surface of a turn, before being buried by the glass of the subsequent turn, is exposed to the atmosphere surrounding the mandril, volatile components which are useful for the chemical composition of the glass being evaporated from this surface. Consequently, the cross-section of the glass envelope shows thin boundary layers ($c$–$b''$) having a chemical composition differing from that of the glass of the turns B and C. The various boundary surfaces essentially constitute a single helical boundary surface. If the glass layer could be cut through, for example, somewhere midway the mandril 2 and at right angles to the centre line thereof, such a cross-section would exhibit a large number of cut boundary surfaces which together constitute a single helix. The threads of the helix are close together on the inner surface of the glass layer, the distance between the threads becoming larger towards the outer surface thereof.

FIGURE 3 shows in what manner the glass envelope leaves the mandril. For the sake of simplicity, there is started from a situation in which the initial ribbed glass envelope has not become fully smooth. The ribs on the glass envelope, or at least what is left thereof, are located in a stringent configuration. Upon leaving the lower end of the mandril, a given rib starts to flow out at several points at the same time due to the coherence in the relevant boundary surface being lost to a greater or lesser extent. Now, a plurality of drawing stripes frequently of a hairpin shape 9 are produced in the illustrated manner on the periphery of the product manufactured by the known method.

In FIGURE 4, a qualitative picture of the temperature variation of the outer surface of the glass envelope in an embodiment according to the known method is represented by curve 11, in which point D indicates the temperature of the glass flowing onto the mandril and point E indicates the temperature of the glass envelope at 8.

By working with a temperature of the glass stream (P in FIGURE 4) which is considerably lower than that used normally, it is ensured that the said evaporation during the period of the rolling off of the band sections is greatly suppressed. If no particular steps were taken, the temperature of the glass envelope in the levelling zone becomes too low to arrive at the desired levelling of the surface of the glass envelope. According to the invention, the temperature of the glass envelope, after the rolling off process has ceased (indicated by 6 in FIGURE 4), is therefore again increased considerably. For this purpose a slidable heating zone 4 is arranged around the glass envelope. As a result of the heating which takes place in this zone, the temperature of the outer surface of the glass envelope increases as the glass is farther remote from the starting point of the heating, as appears from the shape Q–R of the full line curve 12 in FIGURE 4. At point 7 in FIGURE 4, the temperature (R) of the outer surface of the glass envelope has increased to a value such that after further cooling, in analogy with the portion M–E of curve 11, the temperature of the glass envelope at the lower end 8 of the mandril 2 would be higher than the desired temperature for running off of the glass (point K of the curve 13). In order to obtain nevertheless the desired temperature of the glass at the lower end of the mandril, the mandril could be given a greater length so that the cooling process according to curve 13 can continue to point L. In connection with any deglazing phenomena occurring, it may be objectionable to increase the specific surface of the mandril ($m^2$ surface of mandril per 1000 kgs. of glass per hour). In another embodiment of the invention, the specific surface of the mandril may be retained by causing the glass envelope 3, after the heating zone 4, to traverse a zone 5 for forced cooling. In this zone the temperature of the outer surface of the glass envelope is reduced in a constrained manner to the desired temperature E for the running off of the glass (portion R–E of curve 12).

The heat transfer between the heating device 4 and the glass envelope 3 and that between the glass envelope and the cooling device 5 takes place in practice wholly by radiation. The temperature of the inner surface of the heating device is then maintained higher and that of the cooling device maintained lower than the temperature of the outer surface of the glass envelope moving through these two devices.

What is claimed is:

1. In the manufacture of glass tube and rod in which molten glass is supplied from a feeder to one end of a declined mandril rotating about its longitudinal axis, the glass envelope developed on the periphery of this mandril from the molten glass supply and surrounding the mandril leaving the other end of the mandril in the form of tube or rod, and the glass mass present on the mandril being exposed to heat; a method of minimizing glass component evaporation characterized by the steps comprising applying molten glass to a mandril at a temperature not substantially higher than necessary for the glass to flow unimpeded, heating the glass on the mandril in a discrete zone to a temperature higher than the temperature of the glass on said mandril at the supply area, and thereafter controlling the temperature of the glass on said mandril to obtain a desired temperature of the glass leaving said mandril.

2. A method as claimed in claim 1, characterized in that the heat applying zone begins in the area where the rolling-off process of the glass stream helically flowing onto the mandril is substantially terminated.

3. A method as claimed in claim 1, characterized in that the glass envelope on the mandril is cooled in a zone downstream of the heat applying zone wherein the temperature of the glass envelope on the mandril is decreased to the desired temperature for the running off of the glass from the mandril.

References Cited by the Examiner

UNITED STATES PATENTS

| | | | |
|---|---|---|---|
| 1,219,709 | 3/17 | Danner | 65—184 |
| 2,583,431 | 1/52 | Laidig et al. | 65—184 |
| 2,958,160 | 11/60 | Cooke et al. | 65—161 |

DONALL H. SYLVESTER, *Primary Examiner.*

IVAN R. LADY, MORRIS O. WOLK, *Examiners.*